June 21, 1932. W. H. INMAN ET AL 1,864,437
PROTECTIVE BOOTH FOR BANKS
Filed July 15, 1929 5 Sheets-Sheet 1
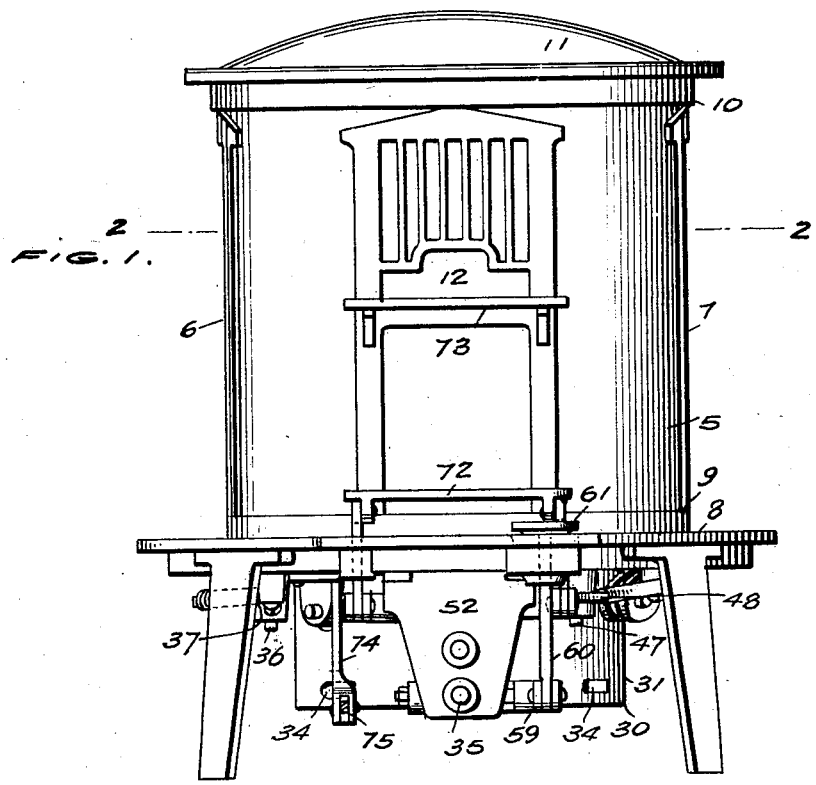
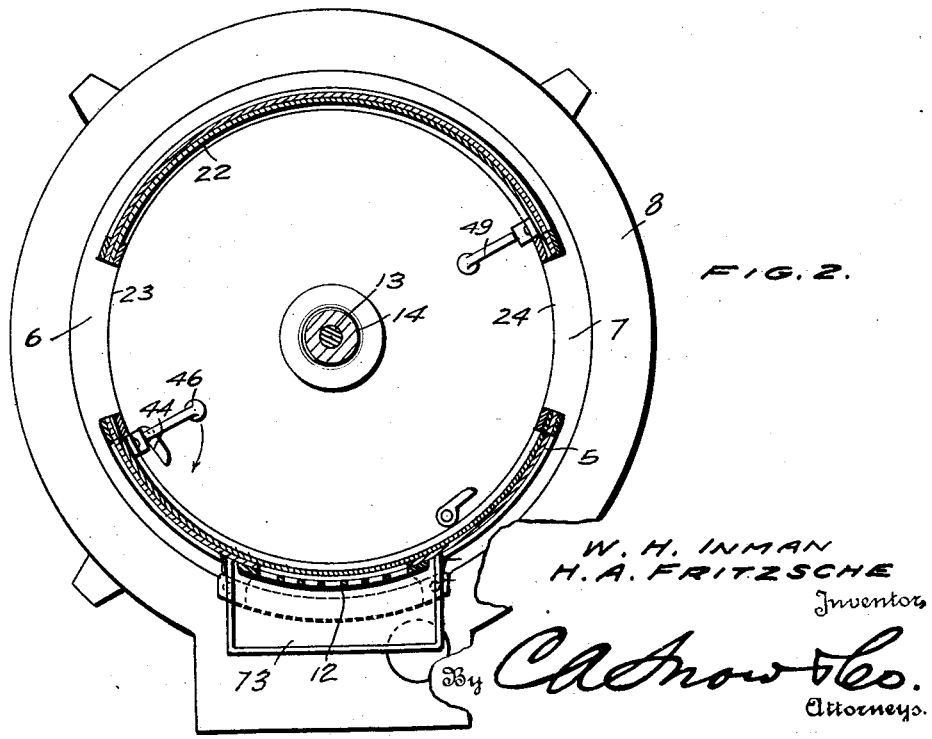
W. H. INMAN
H. A. FRITZSCHE
Inventors
By C. A. Snow & Co.
Attorneys.

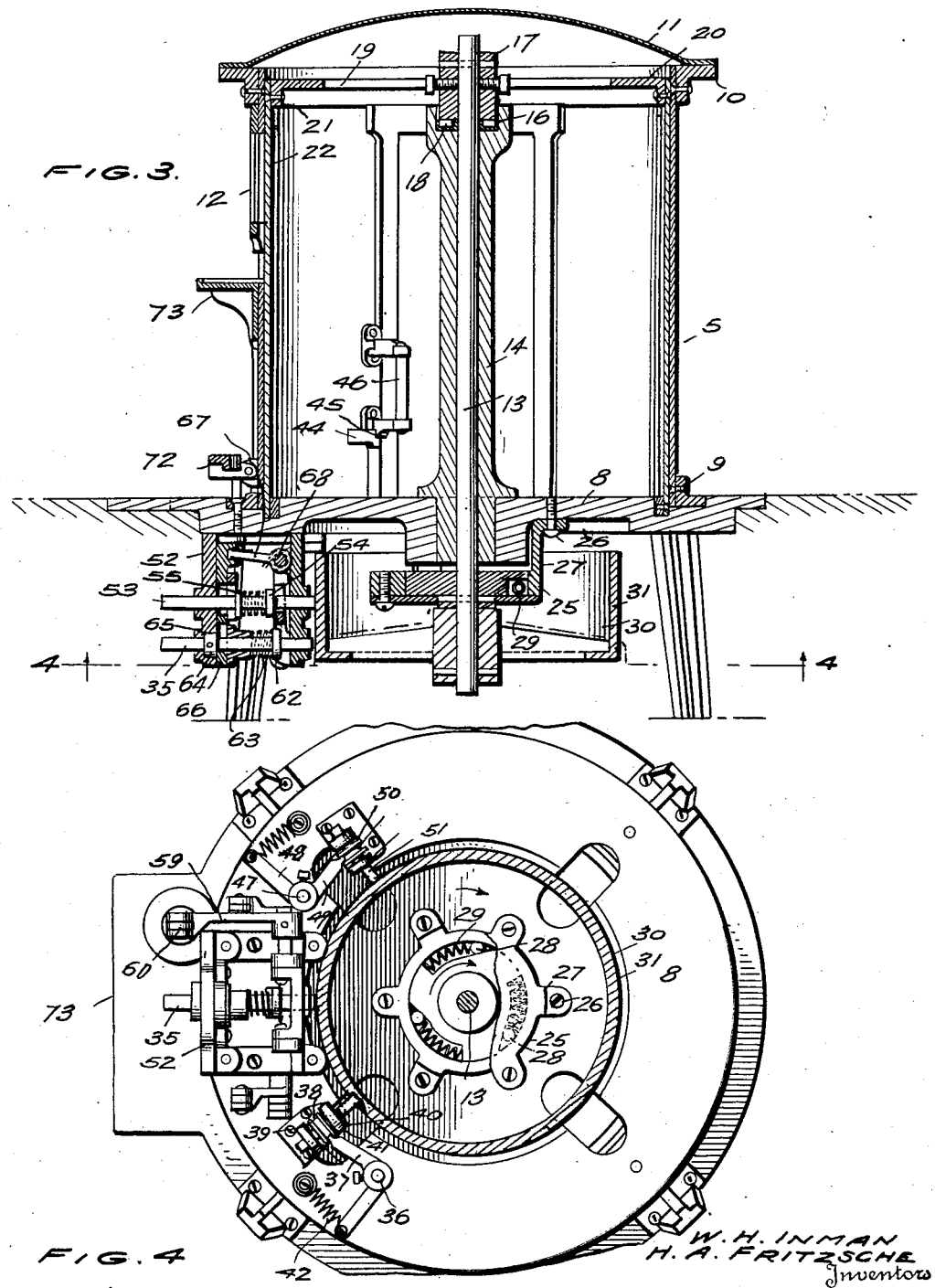

June 21, 1932.  W. H. INMAN ET AL  1,864,437
PROTECTIVE BOOTH FOR BANKS
Filed July 15, 1929  5 Sheets-Sheet 3
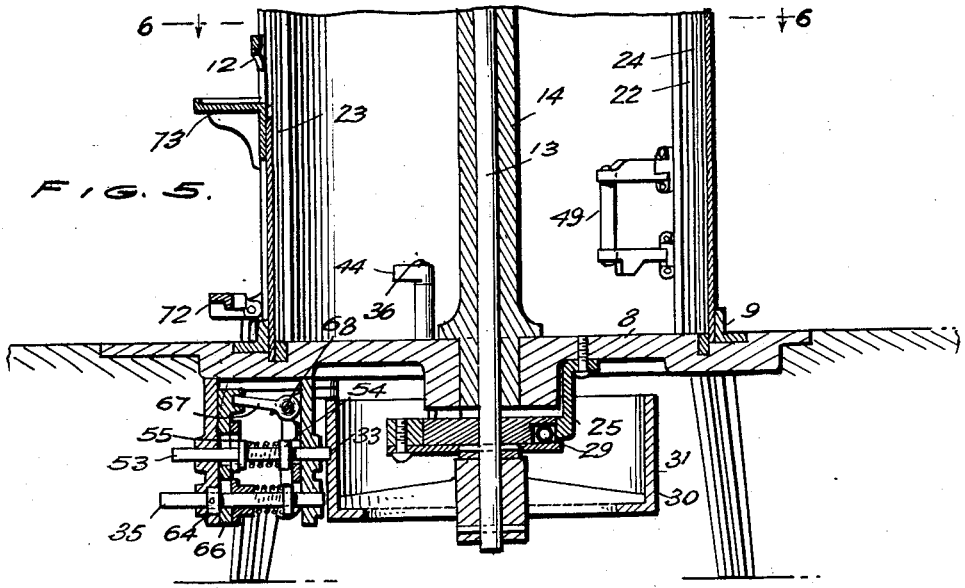
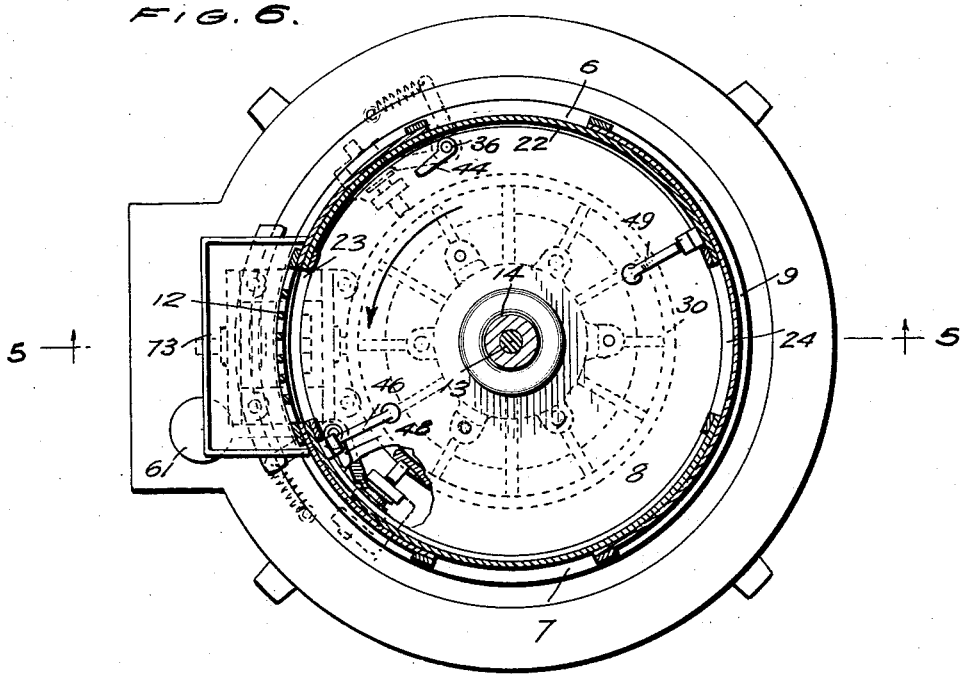
W. H. INMAN
H. A. FRITZSCHE
Inventors June 21, 1932.  W. H. INMAN ET AL  1,864,437
PROTECTIVE BOOTH FOR BANKS
Filed July 15, 1929   5 Sheets-Sheet 4
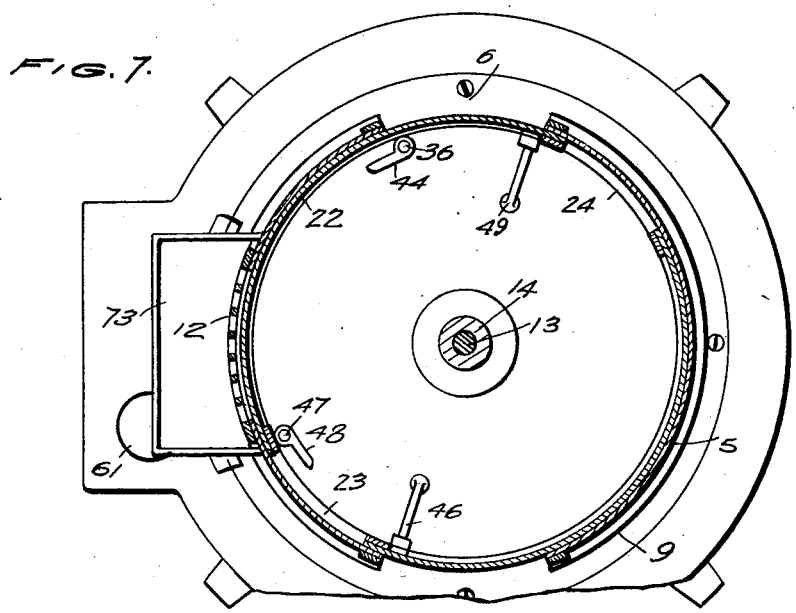
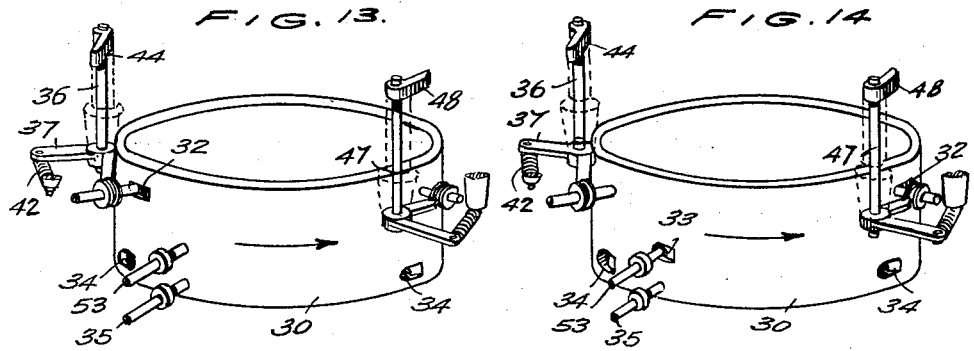
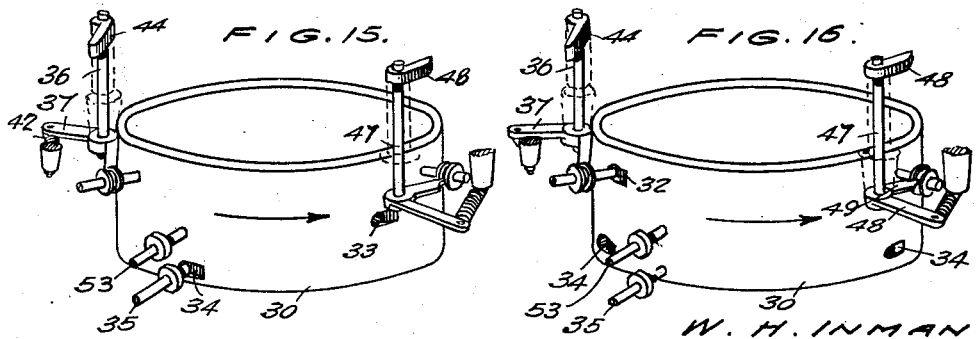

June 21, 1932.  W. H. INMAN ET AL  1,864,437
PROTECTIVE BOOTH FOR BANKS
Filed July 15, 1929   5 Sheets-Sheet 5

W. H. INMAN
H. A. FRITZSCHE
Inventors

By C. A. Snow & Co.
Attorneys.

Patented June 21, 1932

1,864,437

UNITED STATES PATENT OFFICE

WILLIAM HARRY INMAN, OF KEOKUK, AND HENRY A. FRITZSCHE, OF BURLINGTON, IOWA

PROTECTIVE BOOTH FOR BANKS

Application filed July 15, 1929. Serial No. 378,445.

This invention relates to a protective booth for banks or the like, and aims to provide protecting booths arranged adjacent to the tellers' windows so that clerks working behind the windows may be protected against robbers endeavoring to rob the bank.

An important object of the invention is to provide a booth of this character having a closure of a novel construction which may be controlled by the person entering the booth to transact business, the closure being of such a construction, that when the closure is moved to its closed position, the teller's window adjacent to which the booth is positioned, will be open.

Another important object of the invention is to provide means controlled by the teller or clerk, for locking the closure in its closed position, thereby preventing the escape of a person standing in the booth, should the person attempt to rob the teller.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a booth constructed in accordance with the invention.

Figure 2 is a sectional view taken on line 2—2 of Figure 1.

Figure 3 is a vertical sectional view through the booth.

Figure 4 is a transverse sectional view taken on line 4—4 of Figure 3.

Figure 5 is a sectional view taken on line 5—5 of Figure 6.

Figure 6 is a sectional view taken on line 6—6 of Figure 5.

Figure 7 is a transverse sectional view taken on line 7—7 of Figure 3.

Figure 13 is a perspective view illustrating the locking members showing the positions of the locking members when the closure of the booth is moved to its open position to permit a person to enter the booth.

Figure 14 is a perspective view illustrating the locking members as locking the closure in a position to permit the occupant of the booth to transact business through the window adjacent to the booth.

Figure 15 is a perspective booth illustrating the locking members as operated to close both openings to the booth, and the teller's window.

Figure 16 is a perspective view illustrating the position of the locking members after they have been operated and the closure of the booth moved to its neutral position.

Figure 8:
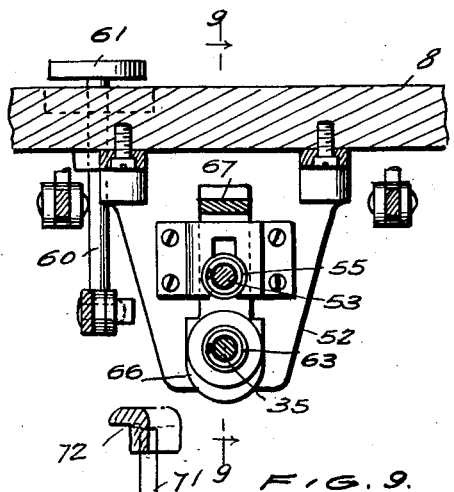
Figure 8 is a sectional view through the booth.
Figure 10:
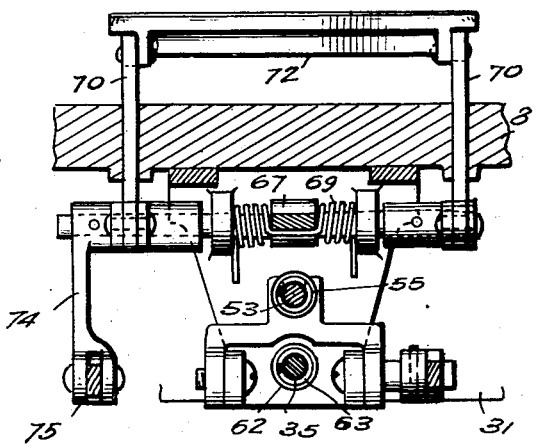
Figure 10 is a sectional view through the operating mechanism for operating the locking device.
Figure 9:
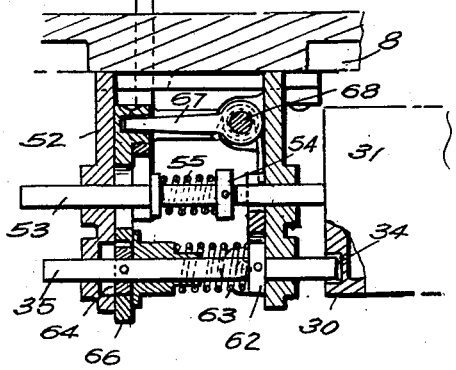
Figure 9 is a sectional view taken on line 9—9 of Figure 8.

Referring to the drawings in detail, the safety booth comprises a cylindrical body portion 5 having oppositely disposed openings 6 and 7 respectively, to permit persons to enter the booth to transact business and to pass from the booth after the transaction has been completed. The body portion 5 is mounted on the base 8 and is secured thereto by means of the circular flange 9 which in turn is secured to the base, the base being embedded in the floor of the bank or business house so that the upper surface thereof is flush with the floor.

At the upper end of the body portion 5 is a circular flanged member 10 to which the cover 11 is secured as clearly shown by Figure 3 of the drawings, the cover being of any desirable contour.

A window 12 is formed at one side of the booth and constitutes the teller's window through which business is transacted, it being obvious that the teller stands directly behind the window 12 or in a position to receive or deliver money through the window. Extending through the central portion of the booth, is a vertical shaft 13 surrounded by the tubular bearing 14 which has a flange 15 at its lower end resting on the base 8, the upper end of the bearing member 14 being provided with a recess 16 in which the lower end of the hub 17 extends. Rollers 18 are positioned in the recess 16 and provide a support for the hub 17 to permit the hub and cylindrical closure supported thereby, and to be hereinafter more fully described, to be rotated readily.

Radiating from the hub 17 are arms 19 that are connected at their outer ends by the integral circular member 20 that has a depending circumferential flange 21 to which the body portion 22 of the closure is secured. The body portion of the closure 22 is also provided with openings 23 and 24 respectively disposed directly opposite to each other, which openings are adapted to move to positions opposite the body portion 5 to allow people to pass into and out of the booth to transact business through the window 12 thereof. It might be further stated that the openings of the closure are so arranged that when both sides of the body portion are opened, the teller's window is closed, and that when the teller's window is opened both of the openings of the body portion are closed.

Secured to the underside of the base 8 is a stationary clutch member 25 which is secured to the base by means of the bolts 26 that pass upwardly through the openings formed in the upper ends of the integral arms 27.

Secured to the shaft 13 and operating within the member 25 is a movable clutch member 28 formed with cut away portions defining inclined surfaces over which the clutch balls 28 move. These balls 28 are held in their active or clutching position by means of the coiled springs 29, with the result that the shaft 13 and closure secured thereto may rotate in one direction, but be restricted against rotary movement in the opposite direction to prevent persons from reversing the movement of the cylindrical closure 22 to escape therefrom. Secured to the lower end of the shaft 13 is a circular locking member 30 that has a relatively wide flange 31 and arranged at diametrically opposite points in the outer surface of the flange. Adjacent to the lower edge of the flange 31 are recesses 34 arranged in predetermined spaced relation with each other, there being four of such recesses for receiving the sliding locking bolt 35, so that the cylindrical closure may be locked against movement by the paying teller standing in front of the window.

These recesses 32, 33 and 34 are formed with inclined surfaces terminating in shoulders 35 that are engaged by the various locking bolts to prevent rotary movement of the cylindrical closure in one direction, but permit of free rotary movement of the cylindrical closure in the opposite direction.

The reference character 36 designates a vertical shaft that extends through the base of the booth, to which the bell crank lever 37 is secured, one arm of the bell crank lever operating in the groove 38 of the roller 39 which is secured on the sliding bolt 40 at a point between the bearings 41, in which the sliding bolt 40 moves.

This bolt 40 is adapted to move into the recess 32 disposed adjacent to the upper edge of the flange 31. A coiled spring 42 connects with one end of the bell crank lever 37 and acts to normally move the bell crank lever to extend the bolt 40 towards the flange 31 so that as the flange moves under the bolt 41, the bolt 40 will pass into the recess 32 that falls thereunder.

At the upper end of the shaft 36 is a laterally extended curved finger 44 adapted to be engaged by the shoulder 45 formed on the underside of the lower arm of the handle 46, so that by swinging the handle 46 in one direction, the shoulder 45 will move over the curved finger to rotate the shaft and cause the bell crank lever 37 to move the bolt 40 to its unlocked position.

Near the opposite side of the booth, and arranged adjacent to the exit thereof, is a vertical shaft 47 which has a curved finger 48 on its upper end adapted to be engaged by a shoulder formed on the handle 49 secured to the cylindrical closure to operate the shaft 47 in a manner identical with the operation of the shaft 36 as previously described. The bell crank lever 48 is mounted on the lower end of the shaft 47 and has its arm 49 extending into the groove of the roller 50 that is secured to the sliding bolt 51 which in turn moves into the recesses 32 of the flange 31. Thus it will be seen that due to the construction of the handles 46 and 49 the person within the booth may operate the closure to bring one of the openings before the window, and that when business has been transacted, the person within the booth may rotate the closure to bring an opening thereof opposite to the exit of the booth so that the person may pass from the booth.

Figure 11:
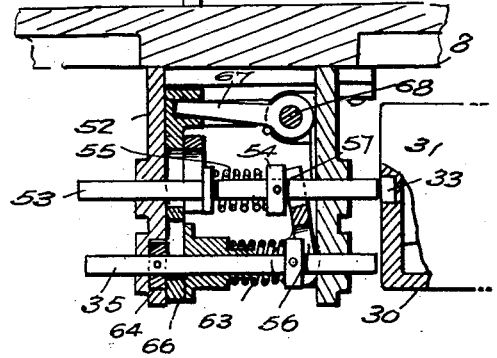
Figure 11 is a sectional view taken on line 11—11 of Figure 10.
Figure 12:
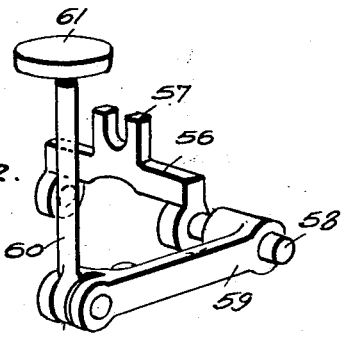
Figure 12 is a perspective view of the lock actuating mechanism for locking the closure of the booth in its closed position.

A bracket member including spaced plates 52, is secured to the under side of the base 8, the plates being provided with openings to receive the sliding bolts 35 and 53, which move into the recess of the flange 31. Secured to the sliding bolt 53 is a collar 54 against which the coiled spring 55 engages to normally urge the bolt 53 to its inner or locked position. Supported by the bracket is an arm 56 which is formed with a forked extension 57 that accommodates the sliding bolt 53, the forked extension contacting with the collar 54, as shown by Figure 11, to move the sliding bolt 53 to its inactive position.

The arm 56 is secured to the shaft 58 to which the arm 59 is connected, the arm 59 extending to a position directly under the lower end of the rod 60 that extends through the base 8 at a point adjacent to the cylindrical body portion 5, and near the teller's window, the rod being provided with a foot piece 61 to be engaged by the foot of the teller or person standing behind the window, so that the person may readily operate the arm 56 to move the bolt 53 to its unlocked position.

The sliding bolt 35 is the positive locking bolt, and is provided with a collar 62 adjacent to its inner end, against which the coiled spring 63 engages to normally urge the sliding bolt 35 inwardly, or to its locked position.

A collar 64 is also secured to the sliding bolt 35 and is adapted to move into the recess 65 of the plate 52 of the bracket. The sliding bolt 35 is normally held in its unlocked position by means of the vertically sliding plate 66 which is provided with elongated openings to accommodate the sliding bolts 35 and 53. The plate 66 is normally held in its uppermost position so that the collar 64 will engage therewith under the action of the spring 63, thereby holding the sliding bolt 35 in its unlocked position.

It will thus be seen that when the plate 66 is moved downwardly to bring the lower opening thereof into alignment with the collar 64, the spring 63 will act to move the bolt 35 towards the flange 31 and into the recess 34 of the flange 31 that falls directly opposite the sliding bolt 35. Movement of the plate 66 is caused by the movement of the finger 67 that is secured to the shaft 68, also mounted in the bracket, the finger 67 being shown as positioned within an opening formed in the inner surface of the plate 66.

A coiled spring 69 surrounds the shaft 68 and acts to normally move the finger 67 upwardly, to hold the plate 66 in its locking position. Secured to the ends of the shaft 68, are arms 70 to which the rods 71 are pivotally connected, the rods 71 having their upper ends disposed directly under the foot bar 72 pivotally supported on the body portion 5, at a point directly under the shelf 73 which is disposed adjacent to the window of the booth. Thus it will be seen that should it be desired to lock the cylindrical closure 22 in its closed position to trap a person in the booth, the teller or person standing at the window may by pressing his foot on the bar 72, move the plate 66 downwardly releasing the sliding bolt 35 and allowing the sliding bolt to move into a recess 34 preventing further rotary movement of the closure.

It is of course understood that the recesses 34 are so arranged in the flange 31 with respect to the openings of the closure, that when the closure is moved to its closed position, a recess 34 will fall opposite to the sliding bolt 35 to accomplish this locking result.

In order that the shaft 68 may be operated from a point remote from the booth, an arm 74 is provided and depends from the shaft 68, arm 74 being connected with a bar 75 which may extend to any point of the building, so that in an emergency, the bar 75 may be moved to release the bolt 37 and lock the closure against movement.

The operation of the device is as follows:

The closure being in a position as shown by Figure 2, a person wishing to transact business before the teller's window, passes into the booth. The handle adjacent to the entrance opening is pushed forwardly to rotate the closure, the handle at the same time operating to release the sliding bolt 40 from its recess and allowing the closure to move. When the opening of the closure moves to a position opposite to the teller's window, the sliding bolt 53 moves into a recess, locking the closure against further movement. The person transacting business is now within the booth, the entrance and exit thereof being closed. After business has been transacted the person within the booth moves the handle which now rests over the finger 48, and the teller at the window presses his foot on the foot piece 61 operating the sliding bolt 53 and permitting the person within the booth to rotate the closure until an opening thereof is opposite to the exit opening of the body portion. Should the person within the booth attempt to rob the bank, the person at the window may by forcing the bar 72 downwardly, release the locking bolt 35 permitting the bolt to move into a recess 34 trapping the robber in the booth with all the openings of the booth closed. The sliding bolt 35 may be manually moved to its inactive position, in any suitable manner.

We claim:

1. In a device of the class described, a base, a cylindrical body portion mounted on the base and having oppositely disposed openings, a cylindrical member having openings to register with the openings in the body portion, mounted for rotary movement within the body portion, a shaft for supporting the rotary member, a substantially wide circular flange secured to the shaft and disposed under the base, said flange having recesses formed in one side thereof and having recesses spaced from the first mentioned recesses, a sliding bolt for engaging within the first mentioned recesses to restrict rotary movement of the rotary member to secure the rotary member in one of its positions of adjustment, a sliding bolt adapted to move into the second mentioned recesses to lock the rotary member against movement, means for preventing rotary movement of the rotary member in a reverse direction, and means for controlling the sliding bolts from a point exteriorly of the body portion.

2. In a device of the class described, a stationary base, a circular body portion secured to the base and having entrance and exit openings, a vertical shaft extending through the base and body portion, a cylindrical closure mounted on the shaft to rotate therewith and having openings to register with the openings of the body portion, a circular locking member secured to the shaft under the base, sliding bolts operating under the base and co-operating with the circular locking member to secure the circular locking member against movement, means disposed within the body portion for operating the bolts to release the cylindrical body portion, and locking means controlled from a point exteriorly of the body portion for locking the cylindrical closure against movement.

3. In a device of the class described, a stationary base, a stationary cylindrical body portion mounted on the base and having openings, a rotatable shaft extending through the body portion, a cylindrical closure having openings mounted on the shaft, the openings of the closure adapted to register with the openings of the body portion to permit persons to pass into and out of the body portion, locking means for restricting movement of the shaft and closure, means controlled by a person entering the body portion, for operating the locking means to release the closure, said body portion and closure having window openings, sliding bolts for locking the closure against movement, and means controlled exteriorly of the body portion for operating the last mentioned sliding bolts, from a point exteriorly of the body portion.

4. In a device of the class described, a stationary cylindrical body portion mounted on the base and having an entrance opening, an exit opening and a window opening, a rotary cylindrical closure operating within the body portion and having an entrance opening, and an exit opening, locking means for automatically locking the closure in its open position, means operable from within the closure for releasing the locking means to allow the closure to rotate, means for automatically locking the closure in its closed position, and means operable from a point exteriorly of the closure for releasing the last mentioned locking means.

5. In a device of the class described, a base, a cylindrical body portion having an entrance opening, an exit opening and a window opening, a cylindrical closure having an entrance opening, and an exit opening, the openings of the closure adapted to register with the openings of the body portion, a supporting shaft to which the closure is secured, a locking member including a wide flange, secured to the shaft, said shaft having keeper openings arranged in staggered spaced relation with each other, bolts engaging the flange and adapted to move into the keeper openings to lock the closure in its open or closed position, means controlled from a point within the closure for operating certain of the bolts to release the closure, and means operable from a point exteriorly of the closure for operating certain of the bolts for releasing the closure.

6. In a device of the class described, a stationary circular body portion having an entrance opening, an exit opening and a window opening, a cylindrical closure operating within the body portion and having openings to register with the openings of the body portion, means for locking the closure in its open position, a handle within the closure, means for transmitting movement of the handle to the closure locking means to release the closure locking means when the handle is operated to rotate the closure, and means controlled from a point exteriorly of the body portion for locking the closure against movement.

7. In a device of the class described, a body portion having an entrance opening, an exit opening and a window opening, a rotatable closure having openings to register with the openings of the body portion, a vertical shaft on which the closure is mounted to rotate therewith, a locking member including a wide flange having keeper openings, sliding bolts operating adjacent to the wide flange, means for urging the sliding bolts towards the flanges to lock the closure against movement, a locking bolt normally held in its inactive position, and means disposed exteriorly of the body portion for releasing the last mentioned locking bolt to lock the closure against movement.

In testimony that we claim the foregoing as our own, we have hereto affixed our signatures.

WILLIAM HARRY INMAN.
HENRY A. FRITZSCHE.